United States Patent [19]

Young

[11] 4,214,888
[45] Jul. 29, 1980

[54] FOLIAR FERTILIZATION METHOD AND COMPOSITION

[75] Inventor: Donald C. Young, Fullerton, Calif.

[73] Assignee: Union Oil Company of California, Los Angeles, Calif.

[21] Appl. No.: 912,527

[22] Filed: Jun. 5, 1978

[51] Int. Cl.$^2$ .......................... C05C 9/00; C05B 15/00
[52] U.S. Cl. ............................................ 71/28; 71/29; 71/30
[58] Field of Search ................. 71/28, 29, 30, 1, 64 C; 252/544

[56] References Cited

U.S. PATENT DOCUMENTS 4,013,446    3/1977    Beresky et al. ........................... 71/29

OTHER PUBLICATIONS

Sauchelli, Vincent, Editor, "Fertilizer Nitrogen", Reinhold Publishing Corp., New York, 1964, pp. 258-259.

*Primary Examiner*—Joseph Scovronek
*Assistant Examiner*—Chris Konkol
*Attorney, Agent, or Firm*—Dean Sandford; Michael H. Laird

[57] ABSTRACT

Aqueous urea solutions particularly suited for foliar fertilization are disclosed. They are characterized by low phytotoxicity, low corrosivity, and improved toxicity stability and comprise urea nitrogen and between about 0.005 and about 0.1 molar equivalents per mole of urea of a pH buffer having a buffering point between about 6 and about 7.6. Also provided are aqueous urea solutions suitable for foliar application containing mineral or organic acids, or both, in the presence or absence of a pH buffer having pH values between about 6 and 7.6. Either solution is foliarly applied at substantially non-toxic rates of at least about 10 pounds of nitrogen per acre.

12 Claims, No Drawings

FOLIAR FERTILIZATION METHOD AND COMPOSITION

BACKGROUND

Urea solutions have been extensively investigated for foliar fertilization and have found significant commercial application in many uses. However, their acceptance has been limited by the risks of crop damage and loss due to unpredictable phytotoxicity. Many crops are unacceptable for prime markets if the foilage or fruit is marked or disfigured. Foliar fertilizers can cause such results. The phytotoxicity of urea solutions is notably random in that identical dosage rates (pounds of nitrogen per acre) of identical solutions often exhibit substantially different toxicity levels. One solution may cause no damage whatever and serve the grower's purpose admirably, while another may cause significant damage and economic loss.

Even with these drawbacks there is considerable interest in foliar fertilization with urea. The method allows rapid assimilation of the major and minor nutrients, antibiotics or other plant-treating agents. Assimilation through the foliage is more rapid than is root assimilation from soil applied nutrients. It is not uncommon that minor deficiencies of micronutrients or major nutrients require rapid correction. Soil application is often unable to satisfy these needs. Some micro- and major nutrients, and other agents such as insecticides, etc., are customarily applied to foliage. It would be convenient and less expensive to apply nitrogen in the same step and avoid duplication of effort, schedule conflicts and the cost of multiple crop treatments.

It is therefore one object of this invention to provide an improved foliar nitrogen source. Another objective is the provision of aqueous urea solutions of lower phytotoxicity, corrosivity, and increased storage stability. Another objective is the provision of aqueous urea solutions which can be foliarly applied with little or no phytotoxic effects. Another objective is the provision of an improved method of supplementing nitrogen by foliar fertilization.

In accordance with one embodiment, a stable aqueous urea solution is provided having a pH between about 6 and 7.6, a nitrogen content of at least 1 weight percent as urea, and between about 0.005 and about 0.1 molar equivalents per mole of urea of a pH buffer having a buffer point between about 6 and about 7.6, sufficient to maintain the pH of the solution within the prescribed range.

In another embodiment, aqueous urea solutions of low phytotoxicity and tolerable corrosivity comprise at least about 1 weight percent urea and between about 0.005 and about 0.1 molar equivalents per mole urea of a mineral or organic acid in an amount sufficient to obtain a pH between about 6 and about 7.6, preferably between about 6 and about 7. The acidified solutions can also contain one or more of the buffering compounds applicable in the first embodiment.

In another embodiment the defined urea solutions are employed to foliarly fertilize plants by applying them to the plant at non-phytotoxic dosage levels of at least about 10 pounds of nitrogen per acre.

I have discovered that the foregoing compositions and methods reduce phytotoxic reaction in plants to which these solutions are foliarly applied. Phytotoxicity is a matter of degree. Some plants are more susceptible to foliar damage than are others. Higher urea concentrations and/or dosage levels also increase phytotoxic reaction. Within the context of this invention, reduced or low phytotoxicity refers to the toxic reaction induced by the compositions and methods of this invention as compared to the toxicity of prior art methods and compositions involving similar urea concentrations and per acre dosage rates.

I have noted a substantial decrease in phytotoxicity associated with solution pH reduction to levels of 7.6 and below, preferably below about 7. Solution pH can be reduced with mineral or organic acids as is practiced in one embodiment of this invention. Acidification can be controlled to limit corrosivity.

Corrosivity is a significant consideration in most applications due to the general use of mild steel in fertilizer storage, transport and distribution equipment. When corrosivity cannot be tolerated, solution pH should not be reduced below about 6. The amount of acid required to obtain the desired reduction in phytotoxicity while avoiding unacceptable increase in corrosivity can be determined by any one of several procedures. Initial solution pH can be evaluated and sufficient acid added to reduce pH to the desired level. Conversely, a minor amount of pH indicator can be added to the solution and the mineral or organic acid or mixture thereof is then added until an indicator change is obtained showing that the desired pH has been achieved.

While this embodiment—the addition of mineral and/or organic acids—accomplishes the primary objective of reducing phytotoxicity, it does not produce the improvement in storage stability achieved with the embodiment of this invention involving the use of specific pH buffers. Along with my discovery that phytotoxicity could be reduced as described herein, I have also discovered that, under many conditions, urea gradually decomposes upon storage by a mechanisn that results in the formation of ammonia. This ammonia release increases solution pH and, if allowed to proceed, will convert a non-toxic solution into a toxic fertilizer.

Other mechanisms occurring during storage, shipment, application, or even on the leaves of the treated crop, may also contribute to phytotoxicity. The mechanisms contributing to these effects have not been completely defined. However, I have determined by experimentation on numerous crops that the phytotoxicity of the urea solutions of this invention can be markedly reduced by maintaining the conditions defined.

I have also found that solution pH can and does change with time, presumably due at least in part, to ammonia generation, and that resultant autogenous ammonia can markedly increase solution toxicity. Time dependent pH increase can be counteracted by the embodiment involving the use of suitable pH buffers. Thus such compounds reduce phytotoxicity and provide a product of increased storage stability, i.e., stability against toxicity increase with time, without reducing pH to an unacceptable corrosivity level. Obviously additional storage stability could be achieved by adding excess acid and reducing pH to levels of 5, 2 or even lower. However, this would often require modification of storage, transport and application equipment that could not be justified or tolerated by the involved industries.

The preferred compositions contain a major nutrient source that consists essentially of urea nitrogen with or without a complimentary potassium source. Crops often require a fast-acting nitrogen supply when the potassium and phosphorus supply is sufficient. In such circumstances significant concentrations of the other major nutrients are unjustified and their cost cannot be recovered. Thus the preferred compositions and methods of this invention involve solutions in which the major nutrient source consists essentially of urea nitrogen.

However, a broader embodiment encompasses solutions having substantial potassium concentrations, e.g., 0.5 to 20 weight percent potassium as an organic or inorganic salt or chelate. Illustrated are potassium nitrate, sulfate, chloride, phosphate, acetate, citrate, butyrate, and the like.

Potassium salts are often more toxic when combined with urea. They also tend to increase the overlying gas phase ammonia content in urea solutions containing free ammonia. Thus the toxicity reduction achieved by this invention is particularly beneficial in the case of potassium-containing solutions.

Phosphorus compounds should be avoided except when used in the minor amounts and particular compositions defined herein. Many phosphorus compounds common to the agriculture industry either vary pH or buffer pH at levels other than those required to achieve the objectives of these methods and compositions. Thus their presence complicates the problem of controlling the toxicity of intrinsic ammoniacal nitrogen. Even excess levels of phosphate buffers having suitable buffer points should be avoided because of difficulties associated with excess buffer level as discussed hereinafter.

These compositions should contain at least one and usually at least two weight percent nitrogen as urea. However, due to the markedly lower toxicity of these compositions, most crops will tolerate much higher nitrogen concentrations, e.g., of 10, and even 20 weight percent urea nitrogen and above. The higher nitrogen levels are preferred for economic reasons. They substantially reduce storage, transportation and distribution costs. These compositions and methods are particularly suitable for applications involving application of solutions containing at least about 5, preferably at least 10 weight percent nitrogen as urea up to the urea saturation point.

Solution pH should be controlled within the range of about 6 to about 7.6, preferably between about 6 and about 7. This narrow pH range is necessitated by the several considerations discussed above. Above pH 6, and particularly above 6.5, phytotoxicity increases particularly when the solution contains intrinsic or autogeneous ammonium ion and/or ammonia. Ammonia concentration (as opposed to ammonium ion) appears to correlate with phytotoxicity. Whether or not that correlation completely explains the reduced phytotoxicity of the solutions of this invention, the fact remains that these compositions are less phytotoxic and more stable with respect to phytotoxicity upon aging, than are solutions not controlled as described.

The lower pH limit is dictated by practical considerations. As pointed out above, the majority of transport, storage and application equipment is constructed of mild steel for obvious economic reasons. While critical pH levels, e.g., above 7.6, could be avoided by acidification, the amount of acid required to assure solution stability during storage would increase equipment corrosion rate or equipment modification such as stainless steel construction. The compositions and methods of this invention avoid that necessity. However, in the alternative embodiment of this invention involving acid addition, or acid in combination with the described buffer systems, initial pH or solution pH during application can be reduced below 6, i.e., to the level of 5 or below when corrosion resistant systems are available.

The buffer system preferably has a buffer point within the range of about 6 to about 7. The concentration required depends on several variables including intrinsic ammonium ion concentration, the presence of other materials that may influence pH, and storage and application conditions.

Some urea contains very little ammonia as produced, although ammonia may accumulate during storage or even on the plant foliage after applications. Damage will result in either event. On the other hand, urea sometimes contains substantial amounts of ammonia as produced, e.g., up to 1.5 weight percent ammonia based on urea.

Most urea manufacturing facilities are not designed or operated to monitor and control ammonia content. The consequent variation in ammonia concentration is believed to account, to some extent, if not completely, for the considerable variation in toxicity noted between different urea shipments. The compositions and methods of this invention eliminate this variability and give the applicator and grower much more assurance of low toxicity levels.

The urea solution concentrate, i.e., before dilution for foliar application, if any, or the dilute solution as applied, may contain other materials such as micronutrients, surfactants, adjuvants, dispersants and the like. Some of these may also influence solution pH and, accordingly, should be taken into account when determining the optimum buffer concentration. These factors should also be taken into account to determine optimum acid concentrations in the alternative embodiment of this invention discussed hereinafter. The limits defined herein are ranges that can be readily accommodated at nominal expense considering the beneficial results and assurances obtained.

I have found that the toxicity of solutions containing intrinsic ammonia (or ammonium ion) becomes progressively worse as pH is increased even at higher pH levels. From a practical standpoint, the investment in commercial crops is too great to justify any significant deviation from the pH levels prescribed herein. Accordingly, the grower and applicator will prefer, if not require, the lowest possible toxicity within corrosion limits. That condition is usually realized at pH levels of about 6 to 6.5.

Suitable buffer concentrations are usually within the range of 0.005 to 0.1, preferably 0.005 to about 0.05, mole equivalents per mole of urea. The higher concentrations are preferably used with solutions initially containing larger amounts of intrinsic ammonia or ammonium ion and with solutions that may be subject to storage or application conditions that accelerate urea conversion to ammonia.

Intrinsic ammonia or ammonium ion content can be determined by analysis of the solution or of the urea prior to forming the solution. Elevated levels can be counteracted and essentially detoxified by adding greater amounts of buffer compounds. They can also be controlled, at least in part, with mineral or organic acids as discussed hereinafter. With high intrinsic ammonia or ammonium ion content, I presently prefer to use a combination of acid to neutralize the solution initially and reduce pH to the prescribed range, in combination with a sufficient buffer to assure solution stability during transport, storage and application, as well as low toxicity on the plant foliage. This combination allows for the use of lower buffer concentrations and greater overall economy.

Buffer concentrations substantially above 0.1 mole equivalent per mole of urea should be avoided for several reasons. Too much buffer is unnecessarily expensive and makes subsequent pH elevation or reduction, if desired, more difficult and expensive. Buffer content also contributes to total salt content which, in turn, increases phytotoxicity.

A variety of pH buffers are suitable for these purposes. The composition of these formulations, the relative amounts of each compound when a plurality of compounds are employed, and the general principles involved in buffering have been extensively investigated and are published. Relevant discussion is found in the "Acid-base Indicators", I.M. Kolthoff, McMillan Company, New York, N.Y., 1937, and "Determination of pH—Theory and Practice", Roger G. Bates, National Bureau of Standards, Wiley & Son, New York, N.Y., 1954, particularly chapter 5 entitled "Buffer Solutions". Essentially any buffering compounds or compound combination can be employed with the proviso that they be non-phytotoxic. Some of these compounds even contain nutrient materials. However, buffer compositions containing major nutrients other than nitrogen, e.g., potassium and/or phosphorus, should not be added to the compositions of this invention for their nutrient value due to their higher cost and problems associated with excess buffer. The addition of unneeded major nutrients only results in added expense that is not justified and can not be recovered from the grower. Thus buffer concentrations should be maintained within the ranges discussed above, i.e., in amounts required to accomplish the intended phytotoxicity control and stability.

Illustrative buffer systems include monopotassium phosphate-disodium phosphate; sodium hydroxide-monopotassium phosphate; borax ($Na_2B_4O_7 \cdot 10H_2O$)-monopotassium phosphate; citric acid-disodium phosphate; sodium hydroxide in combination with one or more of phosphoric acid, acetic acid and boric acid; ammonium phosphate or polyphosphate having a $P_2O_5/NH_4$ mole ratio between 2.5 and 3.5, e.g., 10-34-0 and 8-24-0 (P—N—K), ammonium citrate-ammonium hydroxide having buffer point between about 6 and 7.6 pH. Some of these buffers can be added as a single compound, e.g., ammonium citrate. Other buffer systems such as combinations of monopotassium phosphate-disodium phosphate, monoammonium-diammonium phosphate, can be produced by adding the two or more compounds to the solution in the appropriate proportions. (Ammonium phosphate buffers can be produced from appropriate proportions of $NH_3$ and $H_3PO_4$ or $(NH_4)_2HPO_4$.) The relative proportions of the several compounds can be selected for greatest economy and effect in view of the standard buffering techniques derived by Kolthoff and Bates, supra.

Some of these and other buffer systems also contain ammonium ion. Within the context of this invention, ammonium ion added with a neutralizing anion is not encompassed within the term "intrinsic ammonia or ammonium ion". That term connotes ammonia or ammonium ion present with the urea solution as formed, with the urea prior to forming the solution, or ammonium ion autogenously produced during storage, transport, etc., by urea decomposition to ammonia.

In reducing and controlling solution pH, the foregoing conditions markedly reduce solution ammonia level. Ammonia content, in turn, is reflected in ammonia partial pressure over the solution. Ammonia partial pressure thus constitutes another variable for defining the suitability of a solution for foliar fertilization. These solutions usually have ammonia concentrations in the gas phase in equilibrium with the solution of less than 40 ppm, usually less than 10 ppm, and preferably less than 5 and even 2 ppm, and below at 20° C. and atmospheric pressure. The ammonia level in the gas phase at equilibrium with the solution under these standard conditions can be determined by conventional gas phase analysis. Solution pH and buffer concentration and composition can be adjusted accordingly to reduce ammonia content and thereby reduce phytotoxicity or increase ammonia content for greater economy, i.e., reduced buffer system utilization, when higher ammonia levels can be tolerated. An ammonia concentration of 10 ppm in the equilibrium gas phase corresponds roughly to an ammonia partial pressure of about $1.5 \times 10^{-4}$ p.s.i.a. at 20° C. at atmospheric pressure. The several embodiments of this invention exhibit the greatest advantage in compositions having substantial intrinsic ammonic nitrogen levels, e.g., those having an ammonic nitrogen/urea mole ratio of at least about $10^{-4}$, especially ratios of $5 \times 10^{-4}$ and above.

In an alternative embodiment sufficient mineral and-or organic acid is added to the solution at any time between solution manufacture and use to reduce the pH to a level within the prescribed range of about 6 to about 7.6, preferably about 6 to about 7. Any mineral or organic acid, not itself toxic to the treated plant, can be used. Illustrative acids are hydrochloric, sulfuric, nitric, phosphoric, phosphorus, boric, acetic, citric, butyric, and the like. When used as the only pH moderator, the acid should be added in an amount sufficient to produce a pH within the specified range. These levels usually correspond to acid concentrations of about 0.005 to about 0.1, preferably about 0.005 to about 0.5 molar equivalents of acid per mole of urea.

Acid requirements can be determined by any one of several procedures. For instance, solution pH can be determined and then the amount of acid required to obtain a pH within the desired range can be added to the solution. In the alternative, a pH indicator can be included and acid added until the indicator color change indicates that the specified pH has been reached.

This embodiment is normally practiced with solutions having initial pH levels about 7.6, or at least above about 7. Sufficient acid is added to produce a pH within the range of preferably about 6 to about 7.

Elevated initial pH is usually due to intrinsic ammonic nitrogen, i.e., ammonium ion and/or ammonia. Intrinsic ammonic nitrogen is often present at levels of at least about 0.005, generally 0.005 to about 0.1, the most often between about 0.005 and about 0.5 molar equivalents per mole of urea.

As in the case of the buffered systems described above, the effectiveness of the acidified compositions for reducing phytotoxicity can also be determined and defined by determining the amount of free ammonia existing in the equilibrium vapor phase over the solution at standard conditions. Thus, for example, it is usually preferable to add sufficient acid and/or buffer, to obtain an ammonia concentration of less than 40, usually less than 10, and preferably less than 5 ppm in the vapor phase in equilibrium with the solution at 20° C. and atmospheric pressure.

In another embodiment the acidified solutions described above can be treated with one or more of the pH buffers previously discussed. In this instance, the buffer content required to achieve the desired toxicity stability is substantially reduced due to the preliminary neutralization of at least a part of the intrinsic ammonic nitrogen. Thus, for example, a solution containing 10 weight percent nitrogen as urea and 0.08 moles of intrinsic ammonic nitrogen per mole of urea, can be treated with 0.006 moles of sulfuric acid and 0.01 molar equivalents per mole of urea of a buffering compound having a buffer point within the specified range. That solution would essentially guarantee the absence of significant phytotoxic reaction when applied to all but the most sensitive crops, that is in the absence of poor storage conditions or the addition of ammonia or pH elevators.

These compositions can contain any one of a variety of other components such as micronutrient compounds, e.g., the oxides, sulfates, nitrates, hydroxides, chelates, etc., of copper, manganese, magnesium, zinc, iron, etc. However, for the reasons pointed out above, the utilities for which these compositions are particularly preferred do not require other major nutrients—potassium and phosphorous. Accordingly, the preferred compositions have potassium and phosphorous levels, if any, less than 10 and, preferably less than 5 weight percent as the element based on elemental nitrogen content.

Phytotoxicity is a relative term which relates both the deleterious activity of a composition applied to plants and the resistance of the plant to that composition. Some plants are very resistant to phytotoxic "burn". Other plants, however, such as lettuce, as much less resistant. Nevertheless, these compositions and methods are applicable to essentially all field and row crops as well as to both seedling and mature conifer and hardwood stands. Illustrative field and row crops include beets, beans, strawberries, lettuce, corn, citrus, grapes, cotton, grain crops, deciduous fruit trees such as pears, apples, and the like.

The ability of any one of these crops to withstand foliar application of a given solution at a given dosage rate can be determined by a series of tests in which solutions of different concentrations are applied to the crop at different per acre dosage levels. The best combination for the given crop in a given set of circumstances, e.g., weather conditions, irrigation schedule, etc., can then be determined by selecting the most economically viable dosage rate and concentration that produces an acceptably low phytotoxic reaction, if any. As a general rule, however, toxicity burn should be limited to less than 5 percent and preferably to a level which is insignificant or undetectable against the background, i.e., untreated crop in the same area.

Minor amounts, e.g., less than 10 and preferably less than 5 percent foliage spotting or browning, can be tolerated in many crops such as timber forests or crops in which foliage appearance is not critical such as corn, grain, beans, and the like. However, spotting of foliage or the crop fruit should be avoided if economically practicable due to the strong consumer preference for unmarked produce. This preference must also be taken into account in preparing solutions for transport or storage for later delivery. Sufficient storage stability must be assured. This can be accomplished with minor increases in buffer and/or acid addition to the solution as prepared. The delivered solution can also be checked immediately prior to application to avoid crop damage by excess ammonia generated during storage or transport.

Obviously the concentration of other materials that might contribute to phytotoxicity should be minimized. Thus the biuret content should be below the presently allowed maximum for foliar fertilization of 0.25 percent based on urea, preferably maintained below about 0.1 percent.

While all of the above factors should be taken into account in determining solution concentration and per acre nitrogen dosage rate, the methods of this invention usually involve applications at rates of at least about 10, usually between 20 and about 600, for row or field crops, preferably between about 30 and about 100 pounds of nitrogen per acre.

I claim:

1. As a composition of matter in aqueous urea solution for foliar fertilization having low ammonia partial pressure, phytotoxicity and corrosivity, improved toxicity stability, and a pH of at least about 6 and less than about 7.6, comprising a nitrogen source consisting essentially of urea in an amount corresponding to at least about 1 weight percent nitrogen, and at least about 0.005 and not in excess of about 0.1 molar equivalents per mole of said urea of a pH buffer having a buffer point between about pH 6 and 7.6, sufficient to maintain (a) the pH of said solution between about 6 and about 7.6 and (b) a low free ammonia content corresponding to an ammonia concentration in the gas phase in equilibrium with said solution at a temperature of 20° C. and atmospheric pressure below about 40 ppm.

2. The aqueous urea solution of claim 1 having an intrinsic ammonium ion/urea mole ratio of at least about $10^{-4}$.

3. The composition of claim 1 comprising at least about 10 weight percent urea nitrogen and a buffer concentration sufficient to maintain a solution pH of about 6 to about 7 and a free ammonia content corresponding to an ammonia concentration in the gas phase in equilibrium with said solution at 20° C. and atmospheric pressure below about 10 ppm.

4. The composition of claim 3 wherein said buffer is a buffer compound pair selected from the group consisting of monopotassium phosphate-disodium phosphate, sodium hydroxide-mono-potassium phosphate, borax-monopotassium phosphate, monoammonium phosphate-diammonium phosphate, citric acid-disodium phosphate, and sodium hydroxide in combination with one or more of phosphoric, acetic and boric acids, and combinations thereof, and said urea concentration corresponds to a nitrogen content of at least about 2 weight percent.

5. The composition of claim 3 having an intrinisic ammonium ion/urea mole ratio of at least about $5 \times 10^{-4}$, and a urea concentration corresponding to a nitrogen concentration of at least about 5 weight percent.

6. The composition of claim 5 having an ammonia partial pressure below about $1.5 \times 10^{-4}$ psi at 20° C.

7. As a nitrogenous foliar fertilizer an aqueous urea solution of low ammonia concentration, phytotoxicity and corrosivity, having a major nutrient content consisting essentially of urea nitrogen, containing at least about 5 weight percent nitrogen as urea and at least about 0.005 but not in excess of about 0.1 molar equivalents per mole of urea of a pH buffer sufficient to maintain the pH of said solution at a level of about 6 to about 7 and a low free ammonia concentration in said solution corresponding to an equilibrium gas phase ammonia concentration below about 10 ppm at 20° C. and atmospheric pressure.

8. The composition of claim 7 comprising at least about 10 weight percent urea nitrogen, a concentration of said buffering compound less than about 0.05 molar equivalents per mole of said urea, and a free ammonia concentration corresponding to an equilibrium gas phase ammonia content at 20° C. and atmospheric pressure of less than about 5 ppm.

9. The method of foliarly fertilizing plants including the steps of applying to the foliage of said plants the solution of claim 1 at a substantially non-toxic dosage level of at least about 10 pounds of urea nitrogen per acre.

10. The method of foliarly fertilizing plants including the steps of applying to the foliage of said plants the composition of claim 3 at a substantially non-toxic rate corresponding to at least about 10 pounds of urea nitrogen per acre.

11. The method of foliarly fertilizing plants with the composition of claim 7 including the steps of applying said composition to the foliage of said plants at a substantially non-toxic rate corresponding to at least about 10 pounds of urea nitrogen per acre.

12. The composition of claim 1 containing added, non-phytotoxic acids selected from mineral and organic acids.

* * * * *